United States Patent
Hsu et al.

(10) Patent No.: US 9,840,648 B2
(45) Date of Patent: Dec. 12, 2017

(54) SMEAR-FREE NONWOVEN COMPOSITE ABRASIVES

(75) Inventors: Shyiguei Hsu, McAllen, TX (US); Alejandro Gomez, Reynosa (MX); Charles G. Herbert, Shrewsbury, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 437 days.

(21) Appl. No.: 12/976,643

(22) Filed: Dec. 22, 2010

(65) Prior Publication Data

US 2012/0009850 A1  Jan. 12, 2012

Related U.S. Application Data

(60) Provisional application No. 61/290,669, filed on Dec. 29, 2009.

(51) Int. Cl.
  *B24B 1/00* (2006.01)
  *B24D 11/00* (2006.01)
  *C09K 3/14* (2006.01)

(52) U.S. Cl.
  CPC ..................... *C09K 3/14* (2013.01)

(58) Field of Classification Search
  None
  See application file for complete search history.

(56) References Cited

U.S. PATENT DOCUMENTS

| | | | |
|---|---|---|---|
| 2,734,812 A * | 2/1956 | Robie | 51/298 |
| 2,958,593 A | 11/1960 | Hoover et al. | |
| 3,265,669 A * | 8/1966 | Hirosawa | C08G 18/10 252/182.11 |
| 3,471,543 A * | 10/1969 | Sayigh | C08G 18/7664 203/72 |
| 4,227,350 A | 10/1980 | Fitzer | |
| 4,835,210 A | 5/1989 | Chin et al. | |
| 4,933,373 A | 6/1990 | Moren | |
| 5,250,085 A | 10/1993 | Mevissen | |
| 5,273,558 A | 12/1993 | Nelson et al. | |
| 5,290,903 A | 5/1994 | Hsu et al. | |
| 5,492,550 A | 2/1996 | Krishnan et al. | |
| 5,681,612 A | 10/1997 | Benedict et al. | |
| 5,919,549 A | 7/1999 | Van et al. | |
| 6,355,406 B2 | 3/2002 | Majumdar | |
| 6,521,005 B1 | 2/2003 | Vincent | |
| 6,645,263 B2 * | 11/2003 | Keipert et al. | 51/298 |
| 6,824,876 B2 | 11/2004 | Swei et al. | |
| 2006/0156634 A1* | 7/2006 | Welygan et al. | 51/298 |
| 2008/0127572 A1 | 6/2008 | Ludwig | |
| 2008/0197526 A1* | 8/2008 | Shafi et al. | 264/137 |
| 2008/0308972 A1* | 12/2008 | Fanget | 264/328.1 |

FOREIGN PATENT DOCUMENTS

| | | |
|---|---|---|
| JP | S55-005971 A | 1/1980 |
| JP | S63-178174 A | 7/1988 |
| JP | H07-268050 A | 10/1995 |
| JP | 2001508362 A | 6/2001 |
| JP | 2003-324087 A | 11/2003 |
| WO | 93-04819 A1 | 3/1993 |
| WO | 94/26468 A1 | 11/1994 |

OTHER PUBLICATIONS

International Search Report from PCT/US2010/061876 dated Sep. 23, 2011, 1pg.

* cited by examiner

*Primary Examiner* — Kaj K Olsen
*Assistant Examiner* — Ross J Christie
(74) *Attorney, Agent, or Firm* — Abel Law Group, LLP; Joseph P. Sullivan

(57) ABSTRACT

A surface-treating article includes an organic matrix substantially engulfed by a binder that includes a reaction product of a blocked polyurethane prepolymer and a mixture of aromatic amines. The aromatic amines include polymethylene polyaniline having a functionality equal to or greater than 4.

14 Claims, No Drawings

SMEAR-FREE NONWOVEN COMPOSITE ABRASIVES

RELATED APPLICATION(S)

This application claims the benefit of U.S. Provisional Application No. 61/290,669, filed on Dec. 29, 2009.

The entire teachings of the above application are incorporated herein by reference.

BACKGROUND OF THE INVENTION

Nonwoven composite abrasives commonly are employed to polish or finish a wide range of metallic surfaces. While suitable for polishing most metals, conventional nonwoven abrasives have a tendency to leave a visible residue on the metal surface of high-temperature alloys, such as titanium-based alloys. This residue is typically known as "smear" and its presence is considered deleterious. The amount of smear present typically is directly proportional to the density of the nonwoven composite abrasive employed to polish the metal.

Smear has been identified as being composed primarily of polyurethane resin, often with trace amounts of nylon. Polyurethane resin is a common bonding adhesive used in nonwoven abrasives, while nylon is a fiber that is employed as a substrate for composite abrasives.

In order to reduce smearing, external lubricants, such as talc, kaolin, metallic stearates (such as zinc stearate, calcium stearate or lithium stearate) and tetrafluoroethylene (such as in powder form) often are added to the polyurethane adhesive. The amount of these external lubricants, however, typically has a limited effect on reducing the presence of smear, and significantly reduces the product life of the nonwoven composite abrasive as a consequence of concomitant increased product shed.

Therefore, a need exists to significantly reduce or eliminate the above-referenced problems associated with nonwoven composite abrasives.

SUMMARY OF THE INVENTION

The present invention generally is directed to a surface-treating article, a method of forming the surface-treating article, and to a method used to abrade a work piece.

In one embodiment, the invention is a surface-treating article that includes an organic matrix substantially engulfed by a binder. The binder includes a reaction product of a blocked polyurethane prepolymer and a mixture of aromatic amines. The aromatic amines contain polymethylene polyaniline having a functionality greater than 4.

In another embodiment, the invention is a method of forming a surface-treating article. The method of forming the article includes combining a blocked polyurethane prepolymer and a mixture of aromatic amines, wherein the aromatic amines contain polymethylene polyaniline having a functionality greater than 4 to thereby form a binder precursor. The binder precursor is combined with abrasive particles and then cured to thereby form the surface-treating article.

In another embodiment, a method of abrading a work piece includes applying to a work piece a surface-treating article that includes an organic matrix substantially engulfed by a binder formed from a reaction product of a blocked polyurethane prepolymer and a mixture of aromatic amines, wherein the aromatic amines contain polymethylene polyaniline having a functionality greater than 4.

The present invention has many advantages. For example, the surface-treating article of the invention is essentially smear free. Further, the surface-treating article provides a balance of cut rate and shed that significantly increases product life of the surface-treating article. The surface-treating article has improved thermal resistance such that the end user does not encounter premature melting of the surface-treating article.

DETAILED DESCRIPTION OF THE INVENTION

The features and details of the invention will now be more particularly described with reference to the accompanying drawings and pointed out in the claims. It will be understood that the particular embodiments of the invention are shown by way of illustration and not as limitations of the invention. The novel features of this invention can be employed in various embodiments without departing from the scope of the invention.

The invention generally is directed to a surface-treating article for use in polishing and finishing a wide range of metallic surfaces, such as surfaces of titanium-based alloys. The invention also is directed to methods of forming and methods of use of the surface-treating article of the invention.

In one embodiment, the invention is directed to a surface-treating article that includes an organic matrix substantially engulfed by a binder. The organic matrix components includes phenoxy resin, antioxidant, rheology modifier, plasticizer, and filler. The binder includes a reaction product of a blocked polyurethane prepolymer and a mixture of aromatic amines. Examples of suitable blocked polyurethane prepolymers include at least one member selected from the group consisting of toluene diisocyanate or methylene diphenyl diisocyanate, poly butyl glycol ether or polyester polyol, polycaprolactone, and methyl ethyl ketoxime.

Suitable aromatic amines include those that are known to those of skill in the art of surface-treating articles. Examples of suitable aromatic amines include aromatic amines having a mixture of the following structural formula:

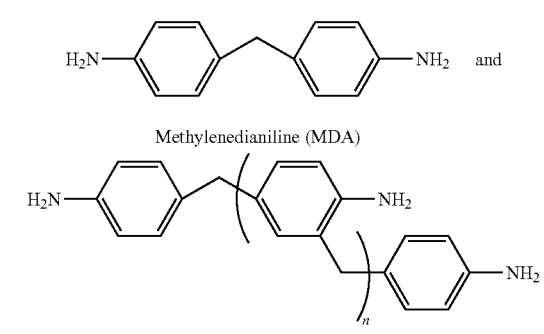

Methylenedianiline (MDA)

$n \geq 2$

Polymethylene Polyanilines

When n>2, the chemical compound is considered to have functionality greater than 4, as the chemical compound has more than four amino functional groups that will react with the polyurethane prepolymer. In one embodiment, n is greater than 2. In another embodiment, n can be greater than 3, 4, 5, 6, 7, 8, 9 or 10.

Examples of suitable polymethylene polyanilines are those that are known to those of skill in the art of surface-treating articles, such as commercially available polymethylene polyanilines made by Air Products having the following structural formula:

1. Ancamine DL-50 which is a mixture of 50%

Methylenedianiline (MDA)

and 50% Polymethylene polyanilines

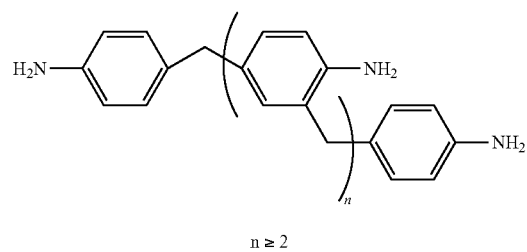

n ≥ 2

2. Ancamine 1482 which is a mixture of <36%

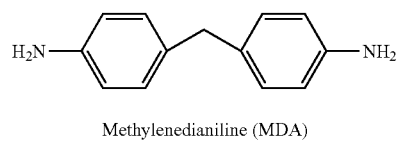 [SMILES: Nc1ccc(Cc2ccc(N)cc2)cc1]

Methylenedianiline (MDA)

<20% Polymethylene polyanilines

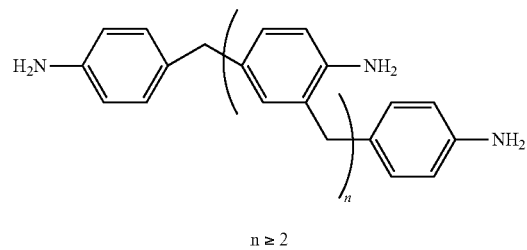

n ≥ 2 and 45% 1,3-phenylenediamine

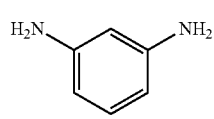

3. Ancamine Y which is a mixture of <45%

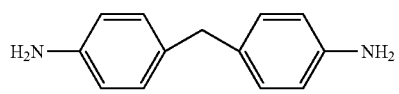

Methylenedianiline (MDA)

<30% Polymethylene polyanilines

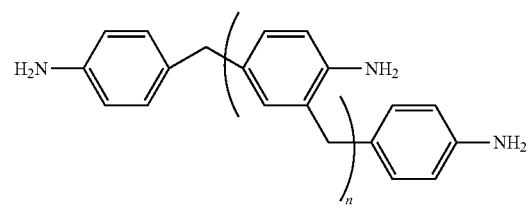

n ≥ 2

<20% 3,4-diaminotoluene

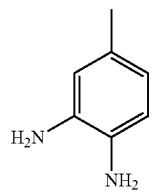

<15% 2,3-diaminotoluene

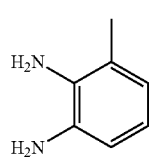

<1% 2,4-diaminotoluene

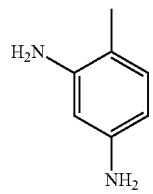

In one embodiment the ratio of blocked polyurethane prepolymer to aromatic amines is in a range of between about 6.5:1 and about 10.5:1. Preferably, the rate ratio of blocked polyurethane prepolymer to aromatic amines is in a range of between about 9.1:1 and about 10.1:1

Suitable components of the organic matrix are known to those of skill in the art of surface-treating articles. Examples of suitable organic matrix components for inclusion in surface-treating articles of the invention include phenoxy resin, antioxidant, rheology modifier, and plasticizer. Typically, the ratio of organic matrix to binder in a surface-treating article of the invention is in a range of between about 0.34:1 and about 0.43:1.

In one embodiment, this surface-treating article of the invention further includes at least one lubricant. Examples of suitable lubricants include at least one member of the group consisting of talc, kaolin, a metallic stearate and tetrafluoroethylene (such as tetrafluorethylene powder). Examples of suitable metallic stearates include at least one member selected from the group consisting of zinc stearate, calcium stearate and lithium stearate.

The amount of lubricant in the binder of the surface-treating article of the invention generally is in a range of between about 7% and about 12% by weight of the binder. More specifically, the range can be between about 10% and about 11%.

In another embodiment, the invention is a method for forming a surface-treating article. The method includes combining a blocked polyurethane prepolymer and a mixture of aromatic amines, where the aromatic amines contain polymethylene polyaniline having a functionality greater than 4, to thereby form the binder precursor. The blocked polyurethane prepolymer and aromatic amines suitable for use in the method are the same as those described above.

The aromatic amines come as mixture of pure MDA and polymethylene polyanilines. An industrial mixer equipped with high shear blade is used to prepare the mixture of the blocked polyurethane prepolymer and aromatic amines. The sequence of addition is shown in the formulation from top to bottom. The high shear blade has a diameter of 16" and rotates at 150-200 RPM. Sufficient time is provided to ensure the final mixture is homogeneous.

The ratios of blocked polyurethane prepolymer and aromatic amines are in the range discussed above, as is the ratio of binder precursor to organic matrix.

The binder precursor is combined with the organic matrix by a suitable method, such as by adding to the binder precursor in the sequence as shown in the formulation under agitation.

The binder precursor is combined with suitable abrasive particles to form a curable abrasive slurry. Examples of suitable particles include silicone carbide, alumina oxide, ceramic abrasives, abrasive agglomerates of grit size between ANSI 60 and ANSI800. The weight ratio of abrasive particles to binder precursor ranges from 1.5:1 to 2.5:1.

In another embodiment, the method is directed to an abraded work piece employing a surface-treating article as described above.

The surface-treating article can be a unitized abrasive wheel. In one embodiment, the unified wheel discs is formed from non-woven abrasive sheets comprising a lofty fiber web bound by a polymer prebond followed by a curable abrasive slurry comprising a binder precursor and abrasive particles. The nonwoven abrasive sheets are stacked, unitized and cured under pressure at an elevated temperature, such as a temperature in a range of between about 90° C. and about 130° C., to form a slab. Specific embodiments of elevated temperature include exposure to a temperature of 126.7° C. for 2 hours, or 98.9° C. for 15 hours. Unified wheel discs are then cut from the slab along with a centered hole for fitting onto the abrasive tool.

The surface-treating article can also be a convolute wheel. In one embodiment, the convolute wheels are be formed from a non-woven abrasive sheet comprising a lofty fiber web bound by a polymer prebond followed by a curable abrasive slurry comprising a binder precursor and abrasive particles. The sheet is attached to a hollow core and spirally wound around the core to form a rolled cylinder. The core is bound via curing at elevated temperature, as described above, and convolute discs are cut from the edge of the bound cylinder.

EXEMPLIFICATION

Example 1

A non-woven substrate consist of crimped Nylon staples of 15 denier is prepared on an air-laid web formation line, such as that sold by DOA (Dr. Otto Angleitner, Ges.m.b.H. & Co.KG, Austria.), at the weight of about 124.4 gsm (grams per square meter). The non-woven substrate is sprayed with acrylic latex on both sides at a total dry weight of 44.4 gsm. The substrate is than passed through an oven to cure the acrylic binder for about 2.4 minutes at 290° F. The non-woven substrate is then cut into square sheets of 43.2× 43.2 cm.

The binder precursor and abrasive slurry is prepared as described above and has a viscosity of 2,500-3,000 cps at 25° C. The solvent of MIBK can be used to adjust the abrasive slurry viscosity.

A two-roll coater is used to impregnate the non-woven substrate with the abrasive slurry by passing the square sheet through the coater nip. The coater nip pressure is adjusted thus the abrasive slurry application is about 197 gsm.

The coated sheets are stacked on top of each other in between two metal plates. The numbers of sheets is determined by the final product density. The stack is then placed in an oven at 126.7° C. for 2 hours and 98.9° C. for 15 hours to complete the curing of the binder precursor, thus forming a cured slab. The cured slab is then cut into unified wheel discs having a centered hole.

Example 2

A non-woven substrate consist of crimped Nylon staples of defined denier is prepared on an air-laid web formation line such that sold by as DOA (Dr. Otto Angleitner, Ges.m.b.H. & Co.KG, Austria) at the defined weight. The non-woven substrate is sprayed with acrylic latex on both sides. The substrate is than passed through an oven to cure the acrylic binder for about 2.4 minutes at 290° F. The non-woven substrate is then rolled into jumbos of 100 yards in length approximately.

The non-woven substrate can be used directly to produce the convolute logs or can go to an additional process to become a pre-size before it is used for making convolute logs.

In the pre-size process, the non-woven substrate is impregnated with a binder precursor by dip and squeeze process in a two-roll coater. The impregnated substrate is then coated with grain in both sides using a gravity hopper. After the grain coat, a phenolic resin based spray coating is applied to secure the grain into the substrate. It is then passed through an oven to cure the polyurethane and phenolic resins for about 15 minutes at 300° F.

A two-roll coater is used to impregnate the non-woven substrate or pre-size with the polyurethane abrasive slurry by passing the non-woven or pre-size substrate through the coater nip. The coater nip pressure is adjusted to comply with the predefined abrasive slurry application for the specific material. The coated substrate is then wound spirally on the machine to form the convolute logs of various diameters and densities. The convolute log density can be varied by adjusting the amount of material wound into the log. The convolute is then placed in an oven at 126.7° C. for 2 hours and 98.9° C. for 15 hours to complete the cure of the binder precursor.

Smear Testing

Smear Test 1 Procedure

A disc of 7.62 cm in diameter is mounted on a portable air grinder that rotates at 18,000 rpm, available from Dynabrade, model 52257. The surface speed at the perimeter of the discs is 71.8 meters per second. A metal work piece of Stainless Steel or Titanium of thickness between 0.1 and 0.25 inches are secured on a workbench with a clamping device. The surface area of the work piece should be large enough to allow for a grinding path of at least 7 inches in length. Prior to the smear test the discs are conditioned by grinding approximately 60 seconds on the work piece with a back and forth movement. The grinding force will be in the range of 4 to 6 lbf, emulating normal hand grinding. Use a clean area on the metal work piece, free from any smear residues left from previous test, and grind in one spot for 10 seconds. Make strokes of 3 to 5 inches in length with a slightly higher pressure and fast moves right after the grinding starts. At least 5 strokes are performed in different areas of the metal. Smear is reported if any residues of disc material are transferred to the work piece in the form of a dark color material film.

Smear Test 2 Procedure

For discs of 15.24 cm in diameter a Baldor bench grinder is used, with the disc rotating at 3,600 rpm. The surface speed at the perimeter of the discs is 28.7 meters per second. In this case the work piece is brought towards the rotating disc. Similar to the Smear Test 1 procedure, the disc will be dressed by grinding a piece of metal work piece for 60 seconds. A clean area in the work piece is selected and grinded for 10 seconds in one area. Fast strokes of 3 to 5 inches in length are made, with constant pressure after the smear test starts. At least 5 strokes are performed, and smearing is then reported.

EQUIVALENTS

While this invention has been particularly shown and described with reference to preferred embodiments thereof, it will be understood by those skill in the art that various changes in form and details may be made therein without departing from the scope of the invention encompassed by the appended claims.

What is claimed is:

1. A non-woven abrasive article comprising:
an organic matrix comprising a non-woven lofty polymer fiber web;
abrasive particles; and
a binder,
wherein the abrasive particles are disposed in the binder,
wherein the non-woven lofty polymer fiber web is substantially engulfed by the binder, wherein the hinder includes a reaction product of an end blocked polyurethane prepolymer and a mixture of aromatic amines, wherein the end blocked polyurethane prepolymer includes:
methyl ethyl ketoxime, toluene diisocyanate, and poly butyl glycol ether; or methyl ethyl ketoxime, methylene diphenyl diisocyanate, and poly butyl glycol ether,
wherein the aromatic amines include polymethylene polyanilines having a functionality equal to or greater than 4, and wherein the polymethylene polyanilines includes at least one compound having the formula:

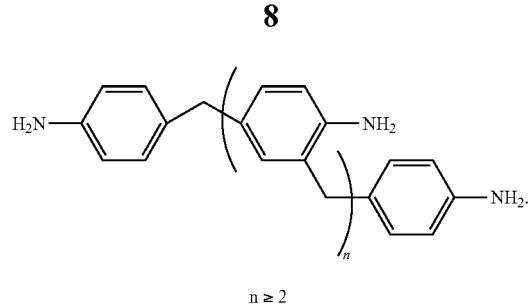

n ≥ 2

2. The non-woven abrasive article of claim 1, wherein the weight ratio of blocked polyurethane prepolymer to aromatic amines is in a range of between about 9.1:1 and about 10.1:1.

3. The non-woven abrasive article of claim 1, wherein the aromatic amine includes at least one compound selected from the formula:

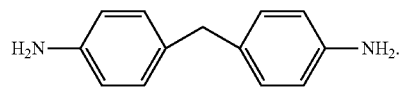

4. The non-woven abrasive article of claim 1, further including at least one lubricant of the group consisting of talc, kaolin, a metallic stearate and tetrafluoroethylene powder.

5. The non-woven abrasive article of claim 4, wherein the metallic stearate is at least one member selected from the group consisting of zinc stearate, calcium stearate and lithium stearate.

6. The non-woven abrasive article of claim 5, wherein the amount of lubricant in the binder is in a range of between about 7% and about 10% by weight of the binder.

7. The non-woven abrasive article of claim 1, wherein the surface-treating article is a unitized abrasive wheel or a convolute wheel.

8. A method of forming a non-woven abrasive article comprising the steps of:
a) combining an end blocked polyurethane prepolymer and a mixture of aromatic amines, wherein the blocked polyurethane prepolymer includes: methyl ethyl ketoxime, toluene diisocyanate, and poly butyl glycol ether; or methyl ethyl ketoxime, methylene diphenyl diisocyanate, and poly butyl glycol ether, and wherein the aromatic amines include polymethylene polyanilines having a functionality equal to or greater than 4, and wherein the polymethylene polyanilines include at least one compound having the formula:

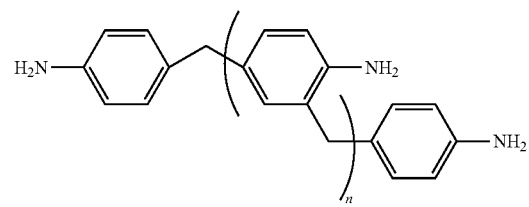

where n≥2, to thereby form a binder precursor;
b) combining the binder precursor with an organic matrix comprising a non-woven lofty polymer fiber web;

c) combining the binder precursor and organic matrix with abrasive particles; and d) curing the binder precursor to thereby form the abrasive article.

9. The method of claim 8, wherein the weight ratio of blocked polyurethane prepolymer to aromatic amines is in a range of between about 9:1 and about 10:1.

10. The method of claim 8, wherein the aromatic amine includes at least one compound selected from the formula:

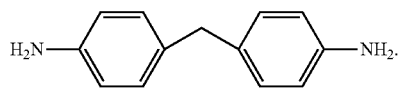 [SMILES: Nc1ccc(Cc2ccc(N)cc2)cc1]

11. The method of claim 10, further including at least one lubricant of the group consisting of talc, kaolin, a metallic stearate and tetrafluoroethylene.

12. The method of claim 11, wherein the metallic stearate is at least one member selected from the group consisting of zinc stearate, calcium stearate and lithium stearate.

13. The method of claim 12, wherein the amount of lubricant in the binder is in a range of between about 7% and about 10% by weight of the binder.

14. A method of abrading a workpiece, comprising the step of applying to the workpiece the non-woven abrasive article of claim 1.

* * * * *